United States Patent Office 3,095,855
Patented July 2, 1963

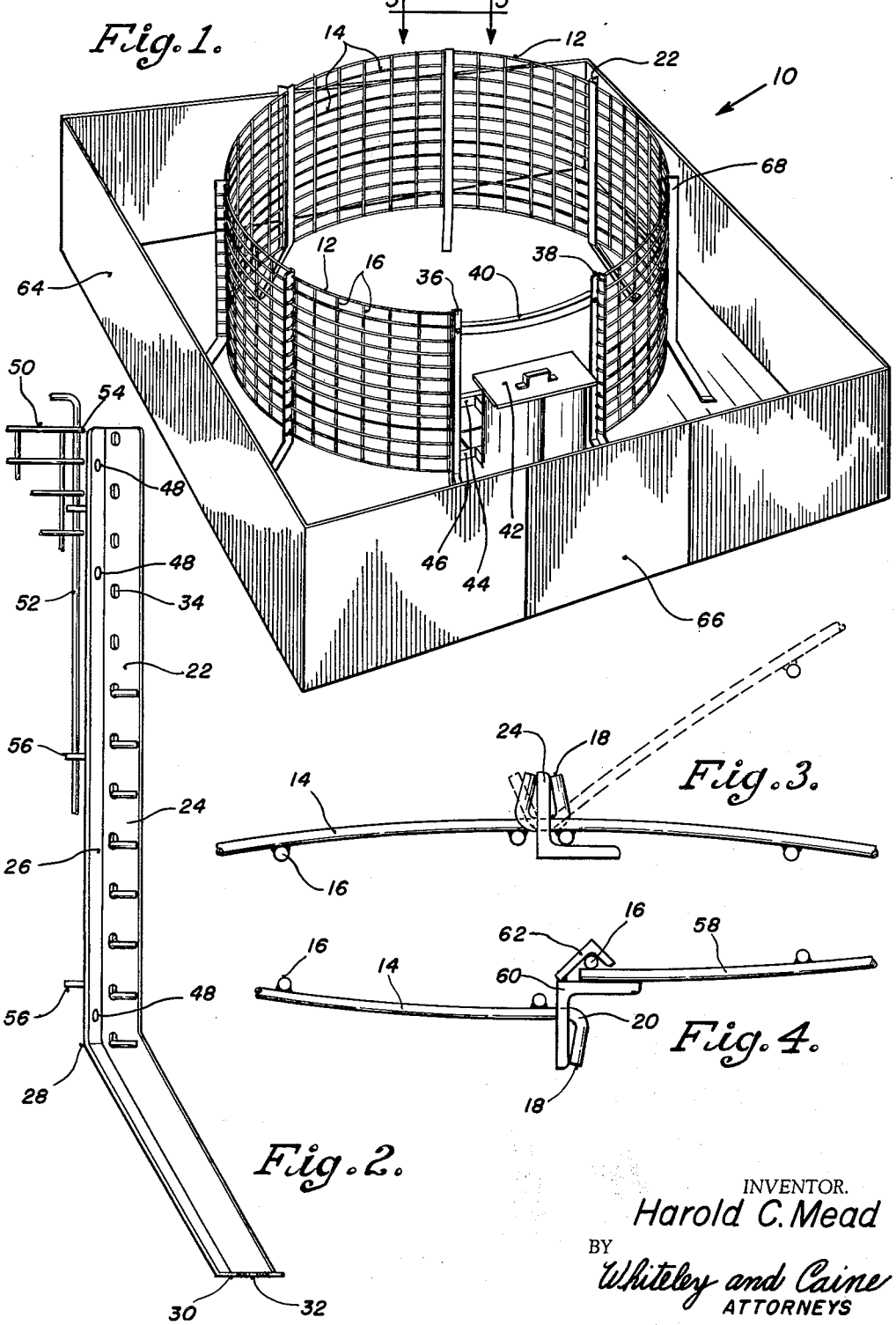

3,095,855
PREFABRICATED WIRE PANEL ENCLOSURE
Harold C. Mead, Charles City, Iowa, assignor to Walsh Manufacturing Company, Charles City, Iowa, a corporation of Iowa
Filed Jan. 5, 1961, Ser. No. 80,864
6 Claims. (Cl. 119—20)

This invention relates to improvements in the construction of prefabricated wire panel structures, and a method of forming and assembling the same. In general, the invention relates to prefabricated structures whose walls must be capable of withstanding substantial lateral pressure, and are composed of sections or panels of wire fabric arranged to interlock with rigid anchored tie members, whose function also includes the support of the wall with respect to a base or floor surface. In particular, the invention is concerned with prefabricated farm structures intended to confine small animals, or the storage of farm crops, which are composed of members that will occupy a minimum of space in storage or transit, and which may be erected at the place of use, without the necessity of employing skilled labor, or the need of specialized tools.

In one form, as disclosed herein, the invention is embodied in the circular wall of a pen for small animals, and which is used for the farrowing of swine. When a sow has given birth to a litter of pigs, she prefers to remain with her litter, segregated from other animals. However, despite the fact that the young pigs will obtain nourishment from the sow's milk, modern practices of animal husbandry require the provision of highly fortified foods, which are intended for the young pigs as supplement to the sow's milk, and therefore, the confining structure must be made in such a way that the young animals have access to the supplement, while barring the sow. This is generally accomplished by spacing the lateral confining wall of the enclosure a sufficient distance upwardly from the ground surface to permit the young animals free access to food, which is outside of the enclosure, while permitting them to return to the sow for milk, and the warmth of the sow's body. Although farrowing pens are known in the art, and one form thereof is disclosed in Walsh Patent 2,842,232, owned by the assignee of this application, it has been found that the confining pen must be big enough to allow for some freedom of movement of the sow, for in the absence thereof, her milk supply is diminished.

In the present invention, I have provided an enclosure formed with a curved wall and composed of a number of wire fabric panels that are joined at their opposite ends to angle iron tie members which are anchored to give rigidity and strength to the structure. The panels are spaced upwardly from the lower extremity of the tie members to provide transit area for the young animals, while confining the sow. Since the sow is free to move within the pen, and she frequently lies in a prone position, particular care must be exercised against a young pig being inadvertently crushed by the sow, if the young animal is trapped by one of the anchored supporting ties, and therefore, at the area beneath the wire panels, the tie members or legs diverge outwardly so as to form an escape area for a pig who might be trapped at that point.

Although it is a practice to permit the sow to leave the confining pen, from time to time, it is desirable that her food and water supply be constantly available, and as disclosed herein, the pen is provided with a gate that forms a support for a feeding and a watering device.

While the invention is primarily disclosed as an animal pen, it is nonetheless within the scope of the invention to make the confining wall without a gate or closure for such purposes as the storing of ear corn or forage crops. In the event that the structure is used for crop storage, the lateral wall may be extended to the ground, and if desired, the structure may be composed of a series of rings supported one above the other and vertically interlocked for strength.

An object of the invention is to provide an improved prefabricated structure composed of wire panels and interlocking anchored tie members.

Another object is to provide an improved method of forming and assembling a curved lateral confining wall composed of wire fabric panels and interlocking tie members.

A further object is to provide an improved pen which is more suitable for confining a farrowing sow, and which is constructed in such a manner as to preclude injury to the young animals.

Other and further objects may become apparent from the following specification and claims, and in the appended drawings in which:

FIG. 1 is a perspective view of a farrowing pen embodying the present invention;

FIG. 2 is a side elevation of one of the supporting ties showing its use in a composite of conditions;

FIG. 3 is a plan view taken on the lines 3—3 of FIG. 1, and which also illustrates a mode of assembly; and, FIG. 4 is a plan view of a vertically slidable gate structure.

Referring now to the several views of the drawing, the invention will be described in detail.

General reference numeral 10 indicates in its entirety a pen used for the farrowing of swine. The pen is composed of a multiplicity of rectangular wire fabric panels 12, each formed with a multiplicity of horizontally extending strands 14, and a multiplicity of vertically extending strands 16 that are joined to the horizontal strands 14, generally by welding or the like. It should be noted that the vertically extending strands 16 join the horizontal strands 14 between the opposite ends of the panels so as to leave the ends of the horizontal strands free, or unattached to any vertical strands. In practice, each panel 12 is cut in such a manner that the horizontal strands 14 are severed midway between the vertical strands so as to provide the free ends 18. Each panel 12 is formed in the arc of a curve, the composite of which will form the periphery of a pen of desired dimension. The free ends 18 of the horizontal strands 14 of each panel 12 are bent at an angle of substantially 90°, as indicated by reference character 20.

The combined tie and leg structures, indicated by reference character 22 are composed of angle iron forming the angular sides 24, 26. The lower end of each of the tie members 22 is angularly bent, as indicated at 28, at an angle of about 30° from the vertical plane so that the foot portion 30 is definitely offset from the vertical plane of the upper portion of member 22. The foot portion 30 is provided with an opening 32 for receiving a fastening device, such as a screw or bolt, not shown, to permit rigid anchoring to a base or floor surface. The side portion 24 of each of the members 22 has a multiplicity of vertically extending slots 34 formed therein at spaced distances with respect to each other sufficient to correspond to the several horizontal strands 14 of the panels 12.

As shown in FIG. 1, two of the tie members 22 each receive the ends of only one wire panel, and these members constitute gate posts designated at 36 and 38. Between the tops of these members extends a brace or stabilizing bar 40. Beneath the bar 40 is a combined feeding and watering device 42, which is supported on brace bars 44, 46. These several bars are bolted to the gate posts 36, 38 by bolts, not shown, passing through openings 48, seen in FIG. 2, in the sides 26 of the gate posts.

Alternate forms of gates or closures may be used. Thus, in FIG. 2, a hinged gate 50 is partially shown, which is hinged or locked by a rod 52 that extends through loops 54 on the ends of horizontal strands, and also through keepers 56 secured to the side 26 of the gate posts. In FIG. 4 is illustrated a form of vertically slidable gate 58, which is supported between two gate posts, one of which is designated at 60, having a bracket 62, within the interior of which is shown one of the vertical wires 16 of the fabric composing gate 58.

Under ordinary circumstances of use, each farrowing pen 10 is enclosed within an outer confining wall 64 that is provided with a suitable gate 66.

In constructing the pen, the several panels 12 of appropriate length, are curved in the arc of a pen of desired size, and the free ends 18 of the strands 14 are then angularly bent to a right angle 20. The tie members 22 are formed with the angular portion 28, and with the several slots 34 in one side 24 of each of the members. Then, commencing with a first tie member, designated at 38, the foot portion 30 thereof is anchored by a suitable fastening device passing through the aperture 32. The outer ends 18 of the first panel are then passed through the apertures 34 of member 38, and the panel is pivoted, such as from the dotted line position of FIG. 3 to the full line position thereof, which interlocks one end of the panel with the tie member. Then, the next tie member, indicated by reference character 68, is placed with its apertures surrounding the opposite ends 18 of said panel, and with the angular portion 28 projecting in line with the panel, and then rotated through an angle of 90° so that the foot portion projects outwardly, thus rigidly securing the first panel, after which the second tie member 68 is then anchored in place with a fastening device passing through the aperture 32. Thus, the first panel is rigidly held between two tie members. The succeeding panels are mounted in the same manner, first by rotating a panel with respect to a rigid tie member, and then rotating the next tie member with respect to the other end of the panel. When the adjacent end strands of two contiguous panels have been secured in this manner, and as shown in FIG. 3, the ends of the two panels interlock with and embrace the side 24 of the tie member, so that when the tie member is anchored through its foot, a rigid immovable joint is formed. The procedure is then continued until the structure reaches the opposite gatepost 36, it being understood that the tie members 36 and 38 each support only one end of each panel and form gate posts. A gate is then either hinged on one of the posts and locked, as shown in a part of FIG. 2, or a vertical slidable arrangement, such as shown in FIG. 4, is used.

In use, the sow is placed within the pen 10, and is provided with food and water in the structure 42. When the young pigs are able to move about, a suitable creep feeder, not shown, is placed within the enclosure 64, outside of the pen, and the young animals may find transit through the area of the enclosure beneath the wire panels, the lower limit of which is at the upper end of the angular portion 28 of the ties or supports 22. In the event that a young animal is in back of the sow when she lies down, the angular portion 28 of each of the tie members provides an escape area so that the young will not be crushed between the sow and the tie member.

In the event that it is desired to form a complete annular wall of panels, without the presence of a gate or other removable closure, the final panel is formed with the end strands on one end of the panel unbent, and after said ends have been projected through the final tie member, said ends are then manually bent to right angles with the use of a simple hand-tool, so that the final effect accomplished is the same as if both ends of the panel had been pre-bent.

An important advantage of the invention is that sows readily accept the form of pen described hereinbefore, since it does provide a limited degree of movement for the animal, and when enclosed with a fence, such as the structure 64, it is segregated from other animals. These features are important, for if the sow is not properly cared for, an adverse psychological condition is created which disturbs her milk supply, and might even cause her to injure her young.

Another advantage is that the young pigs can readily leave the pen to find solid food, which they require for healthy growth, and by means of the angularly bent tie members, the young animals can escape being crushed by the sow.

A further advantage is that the structure can be readily mounted, and dismounted, after the farrowing season and stored in a minimum amount of space. Because of the simplicity of the structure, the pens can be readily cleaned and maintained in a good condition.

A further advantage is that the structure is relatively inexpensive, and therefore, provides the maximum requirements with a minimum of expense.

The invention is defined in the terms of the appended claims.

I claim:

1. A nursing pen, comprising a generally circular lateral enclosure, and a multiplicity of ground engaging members supporting said enclosure in spaced relation to the ground for a distance sufficient to provide access for young animals to and from the area encompassed by said enclosure while confining an adult animal within the interior of said enclosure, the circumference of the curve formed by the lower ends of said ground engaging members being sufficiently greater than the corresponding curve formed by the upper edge of said enclosure to provide a protected area at ground level sufficient to prevent the crushing of a young animal when the latter is caught between one of said ground engaging members and the reclining body of the adult animal.

2. A nursing pen, comprising a generally circular lateral confining enclosure, and a multiplicity of ground engaging members secured to said enclosure and supporting the same in spaced relation to the ground for a distance sufficient to provide access for young animals to and from the area encompassed by said enclosure while confining an adult animal within the interior of said enclosure, the circumference of the curve formed by the lower ends of said ground engaging members being sufficiently greater than the corresponding curve formed by the lower end of the enclosure to provide a protected area at the ground level sufficient to prevent the crushing of a young animal when the latter is caught between one of said ground engaging members and the reclining body of the adult animal.

3. A nursing pen, comprising a multiplicity of vertically extending tie members disposed with respect to each other in a generally circular arrangement, each of said tie members adjacent its lower end being uniformly bent outwardly from the plane of the member, and a generally circular enclosure carried on said tie members above the angular bends therein, the lower limit of said enclosure terminating at a distance from the ground surface sufficient to provide access for young animals while confining an adult animal, and the angular bend of said tie members outwardly from the lower limit of the enclosure being sufficient to prevent the crushing of a young animal when the latter is caught between a tie member and the reclining body of the adult animal.

4. In a prefabricated structure, a wall comprising two contiguous wire fabric panels, each of said panels composed of spaced horizontal strands and a vertical strand joined to the horizontal strands inwardly from one end of the panel to form free ends of the horizontal strands, and a rigid vertical tie member formed with vertically spaced apertures therein in alignment with the horizontal strands of said two panels, the free ends of the horizontal strands of said panels passing in opposite directions through corresponding apertures in said tie member and bent at right angles to the tie member to extend in the same direction on opposite sides of the tie member and embrace said member, the adjacent vertical strand of each panel located on opposite sides of the tie member and in abutting relationship with the strands of the opposite panel to brace and interlock said panels with each other and the tie member.

5. In a prefabricated structure, a wall comprising two contiguous wire fabric panels, each of said panels composed of spaced horizontal strands and a vertical strand joined to the horizontal strands inwardly from one end of the panel to form free ends of the horizontal strands, and a rigid vertical tie member composed of side surfaces diverging at right angles with each other, one of the side surfaces of said tie member formed with vertically spaced apertures therein in alignment with the horizontal strands of said two panels, the free ends of the horizontal strands of said panels passing in opposite directions through corresponding apertures in the side surface of the tie member and then bent at right angles to the tie member to extend in the same direction on opposite sides of the side surface of the tie member and embrace said member, the adjacent vertical strand of each panel located on opposite sides of the tie member in abutting relationship with the strands of the opposite panel, one of said vertical strands being disposed between the other surface of the tie member and the adjacent panel to interlock said panels with each other and the tie member.

6. A farrowing pen, comprising a multiplicity of rectangular wire fabric panels, each of said panels composed of spaced horizontal strands and a vertical strand joined to the horizontal strands inwardly from one end of the panel to form free ends of the horizontal strands, and vertical tie members forming joints between contiguous panels, each of said tie members bent between its opposite ends to form an angle adjacent the lower end of the tie member, said tie members above the angular bend formed with vertically spaced apertures in alignment with the horizontal strands of contiguous panels, the free ends of the horizontal strands of two contiguous panels passing in opposite directions through corresponding apertures in the tie member and bent at right angles to the tie member to extend in the same direction on opposite sides of the tie member and embrace said member, the adjacent vertical strand of each panel located on opposite sides of the tie member and in abutting relationship with the strands of the opposite panel to brace and interlock said panels with each other and the tie member, the spacing of the angular bend of said tie members beneath said panels being sufficient to permit escape of a young animal and provide a haven for a young animal.

References Cited in the file of this patent
UNITED STATES PATENTS

| | | |
|---|---|---|
| 303,126 | Cordtz | Aug. 5, 1884 |
| 1,951,282 | Hise et al. | Mar. 13, 1934 |
| 2,295,271 | Schuck | Sept. 8, 1942 |
| 2,748,904 | Arndt | June 5, 1956 |
| 2,923,273 | Collins | Feb. 2, 1960 |